United States Patent
Barciet et al.

(10) Patent No.: US 11,725,692 B2
(45) Date of Patent: Aug. 15, 2023

(54) CAGE SEGMENT AND ASSOCIATED ROLLING BEARING

(71) Applicant: Aktiebolaget SKF, Gothenburg (SE)

(72) Inventors: Damien Barciet, Lucy-le-Bois (FR); Herve Dondaine, Avallon (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/585,616

(22) Filed: Jan. 27, 2022

(65) Prior Publication Data
US 2022/0235822 A1   Jul. 28, 2022

(30) Foreign Application Priority Data
Jan. 27, 2021   (FR) ...................................... 2100734

(51) Int. Cl.
*F16C 33/51*   (2006.01)
*F16C 33/46*   (2006.01)
*F16C 19/38*   (2006.01)

(52) U.S. Cl.
CPC ........ *F16C 33/513* (2013.01); *F16C 33/4605* (2013.01); *F16C 19/38* (2013.01); *F16C 2300/14* (2013.01)

(58) Field of Classification Search
CPC ...... F16C 19/38; F16C 19/385; F16C 19/386; F16C 33/513; F16C 33/4605; F16C 2300/14
See application file for complete search history.

(56) References Cited

U.S. PATENT DOCUMENTS

| | | | |
|---|---|---|---|
| 10,161,451 B2 | 12/2018 | Capoldi et al. | |
| 2009/0095495 A1* | 4/2009 | Spohn | F16C 33/588 172/601 |
| 2015/0016762 A1* | 1/2015 | Claus | B05D 1/24 29/898.067 |
| 2018/0209480 A1 | 7/2018 | Capoldi et al. | |
| 2018/0231057 A1* | 8/2018 | Capoldi | F16C 33/513 |

FOREIGN PATENT DOCUMENTS

| | | |
|---|---|---|
| DE | 4418912 A1 | 12/1995 |
| DE | 102006004728 A1 | 8/2007 |

* cited by examiner

*Primary Examiner* — Alan B Waits
(74) *Attorney, Agent, or Firm* — Garcia-Zamor Intellectual Property Law, LLC; Ruy Garcia-Zamor

(57) ABSTRACT

A cage segment for a rolling bearing, includes a central portion extending in the circumferential direction and delimiting a plurality of through pockets for receiving rollers. The central portion have first, and second walls extending in the circumferential direction and provided with internal surfaces opposite one another and forming abutment surfaces for the end faces of the rollers. A first lateral shoulder outwardly extends from the first wall of the central portion, and a second lateral shoulder outwardly extends from the second wall of the central portion by being oriented at right angles to the first lateral shoulder, and at least one outwardly open recess being formed on each of the first and second lateral shoulders.

10 Claims, 4 Drawing Sheets

CAGE SEGMENT AND ASSOCIATED ROLLING BEARING

CROSS-REFERENCE TO RELATED APPLICATIONS

This application claims priority to French Patent Application no. 2100734, filed Jan. 27, 2021, the contents of which is fully incorporated herein by reference.

TECHNICAL FIELD OF THE INVENTION

The present invention relates to rolling bearings. The present invention relates more particularly to a cage segment for a rolling bearing, and a rolling bearing comprising segmented cages each comprising a plurality of segments.

STATE OF THE ART

For applications which require axially and radially significant load absorption, it is known practice to use a first type of rolling bearing with three rows of rollers comprising two rows of axial rollers and one row of radial rollers.

However, the bulk of such a rolling bearing requires significant installation space.

For applications in which the load absorptions are lower, it is possible to use a second type of rolling bearing with crossed rollers which have a reduced bulk.

To ensure that the circumferential spacing of these types of rolling bearing is maintained, it is known practice to use a segmented cage which consists of a plurality of successive cage segments in the circumferential direction. Such cage segments are generally made of a synthetic material.

Under the effect of the centrifugal force or when the relative speed of rotation of the inner and outer rings is low, the cage segments can rub on these rings and be damaged. The cage segments can also jam between the raceways of the rings.

It is therefore proposed to wholly or partly mitigate these drawbacks.

SUMMARY OF THE INVENTION

In light of the above, the invention proposes a cage segment for a rolling bearing, the cage segment comprising a central portion extending in the circumferential direction and delimiting a plurality of through pockets for receiving rollers, the central portion comprising first, and second walls extending in the circumferential direction and provided with internal surfaces opposite one another and forming abutment surfaces for the end faces of the rollers.

The cage segment further comprises a first lateral shoulder outwardly extending the first wall of the central portion, and a second lateral shoulder outwardly extending the second wall of the central portion by being oriented at right angles to the first lateral shoulder, at least one outwardly open recess being formed on each of the first and second lateral shoulders.

The recesses make it possible to reduce the friction surface of the cage segments on the inner and outer rings of the associated rolling bearing. The recesses can form reservoirs of lubricant allowing the rollers to be lubricated. The lubricant can for example be grease or oil.

According to a feature, the cage segment comprises at least one recess formed on a guiding surface of the first lateral shoulder which links a free end surface of the shoulder to the central portion.

Advantageously, the cage segment comprises at least one recess formed on a free end surface of the first lateral shoulder.

Preferably, the cage segment comprises at least one recess formed on a guiding surface of the second lateral shoulder which links a free end surface of the shoulder to the central portion.

Preferably, the cage segment comprises at least one recess formed on a free end surface of the second lateral shoulder.

Advantageously, the axial length of the second shoulder is greater than the radial length of the first shoulder.

Preferably, the cage segment also comprises a plurality of beams extending transversely between the first and second walls and linking the walls, each pocket being delimited in the circumferential direction by two successive beams and each beam partly delimiting two successive pockets.

In a particular embodiment, each beam comprises, at a lateral end, a protuberance of concave outer form and intended to come into contact with the outer surface of at least one roller, two protuberances being opposite in the circumferential direction for each through pocket.

The protuberances keep the cage segment centred on the rollers such that, at high rolling rotation speed, when the centrifugal force throws the cage segment, the cage segment is kept centred by the rollers between the raceways, reducing the risk of the cage segment rubbing on the revolving ring.

Advantageously, each beam comprises two protuberances of concave outer form.

Preferably, for each beam, one of the protuberances extends circumferentially on the side of one of the pockets delimited by the beam and the other protuberance extends circumferentially on the side of the other pocket delimited by the beam.

Advantageously, each protuberance of a beam is opposite, in the circumferential direction, a protuberance of the successive beam.

Preferably, the protuberances of each beam are disposed on the opposite lateral ends of the beam.

Advantageously, the protuberances of the beams are identical.

Preferably, each concave protuberance has a circular form when considering an axial cross section of the cage segment.

Advantageously, the radius of curvature of each protuberance is greater by 1.5% to 2.5%, and preferably greater by 2%, than the radius of the rollers.

In another particular embodiment, the cage segment may have no such protuberance or protuberances.

Also proposed is a segmented cage for a rolling bearing comprising a plurality of cage segments as defined previously.

Also proposed is a rolling bearing comprising an inner ring, an outer ring, at least two rows of rollers disposed between raceways of the rings, and at least two segmented cages for holding the rows of rollers, each segmented cage comprising a plurality of cage segments as defined previously, the second shoulders of the cage segments of one of the cages being axially opposite the second shoulders of the cage segments of the other cage.

According to a feature, the first shoulders of the cage segments of the cages extend radially and the second shoulders of the cage segments of the cages extend axially.

Advantageously, a first row of rollers forms an angle of orientation with the axis of rotation of the rolling bearing, and the axis of rotation of a second row of rollers forms the angle of orientation of opposite sign with the axis of rotation of the rolling bearing.

Preferably, the angle of orientation of the rollers is equal to 45°.

BRIEF DESCRIPTION OF THE FIGURES

Other aims, features and advantages of the invention will become apparent on reading the following description, given purely as a nonlimiting example, and with reference to the attached drawings in which.

DETAILED DESCRIPTION OF THE INVENTION

Figure 1:
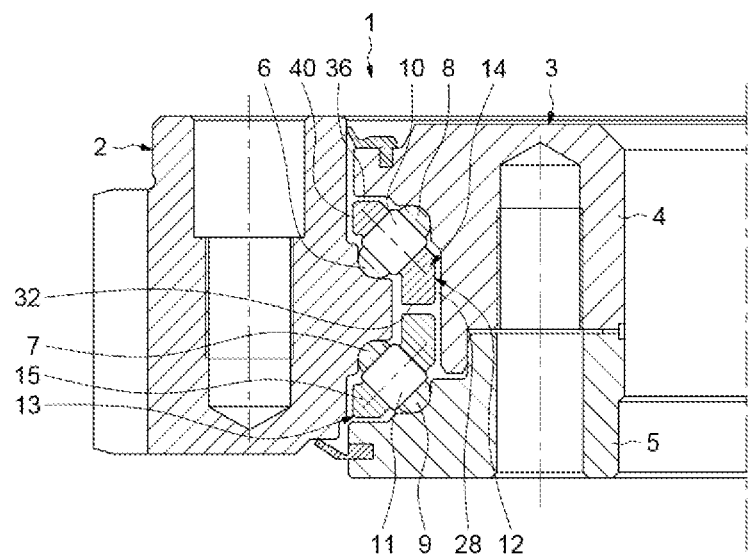
FIG. 1 is a partial cross-sectional view of a rolling bearing according to an exemplary embodiment of the invention.
Figure 2:
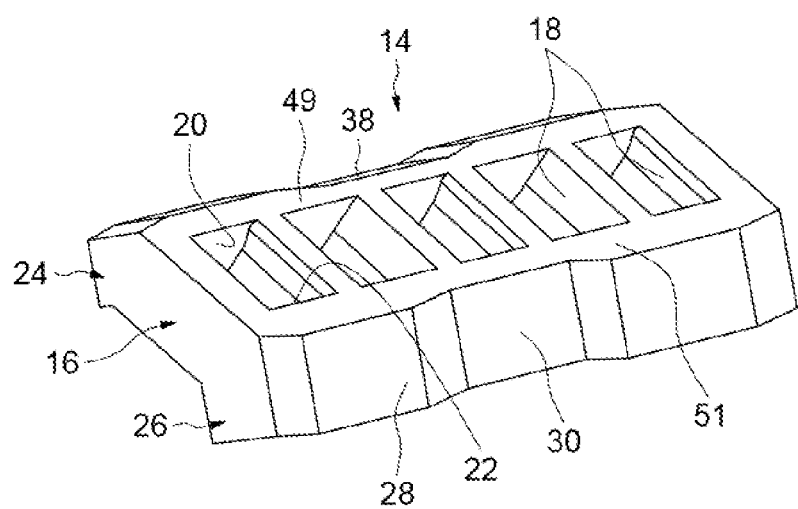
FIGS. 2-5 are perspective views from four different viewing angles of a cage segment of the rolling bearing of FIG. 1.

Reference is made to FIG. 1 which illustrates an example of a rolling bearing 1 comprising an outer ring 2 and an inner ring 3 which are concentric. The outer 2 and inner 3 rings extend axially along the axis of rotation (not represented) of the rolling bearing.

The inner ring 3 is formed by two half-rings 4, 5 stacked axially.

The outer ring 2 comprises two attached raceways 6, 7. The inner ring 3 also comprises attached raceways 8, 9.

The raceways 6, 7, 8, 9 are mounted freely in the outer 2 and inner 3 rings. The raceways 7 to 9 can thus be oriented angularly to compensate for an offset of the inner 3 and outer 2 rings.

The rolling bearing 1 further comprises two rows of rollers 10, 11 disposed respectively between the raceways 6, 8 and 7, 9 of the rings 2, 3. Each roller 10, 11 comprises an outer rolling surface. Each roller 10, 11 comprises two end faces which delimit its outer rolling surface. The axis of rotation of each roller 10 is at right angles to the axis of rotation of each roller 11.

The rolling bearing 1 also comprises two segmented cages 12, 13 for maintaining, respectively, the circumferential spacing of the rows of rollers 10, 11.

Each segmented cage 12, 13 comprises a plurality of successive identical cage segments 14, 15 in the circumferential direction and that come into contact against one another.

Since the cage segments 14, 15 are identical to one another, only one of the cage segments 14 will be detailed hereinbelow.

FIGS. 2 to 5 illustrate different perspective views from four different angles of a cage segment 14.

The cage segment 14 comprises a central portion 16 extending in the circumferential direction and delimiting a plurality of through pockets 18 for receiving the rollers 10.

The central portion 16 comprises first and second walls 49, 51 extending in the circumferential direction and provided with internal surfaces 20, 22 opposite one another. As will be described in more detail hereinbelow, the cage segment 14 also comprises a plurality of beams extending transversely between the first and second walls 49, 51 to delimit the pockets 18 of the rollers.

The first and second walls 49, 51 form abutment surfaces for the end faces of the rollers 10, 11.

The cage segment 14 further comprises a first lateral shoulder 24 outwardly extending the first wall 49 of the central portion 16 and a second lateral shoulder 26 outwardly extending the second wall 51 of the central portion 16 by being oriented at right angles to the first lateral shoulder 24.

The second lateral shoulder 26 comprises a guiding surface 28 linking a free end surface 32 of the shoulder to the central portion 16. As can be seen in FIG. 1, the guiding surface 28 is intended to come radially opposite the inner ring 3. The free end surface 32 is intended to come axially opposite the inner ring 3 of the corresponding free end surface of the cage segment 13.

Referring again to FIGS. 2 to 5, a recess 30 is formed on the guiding surface 28. The bottom of the recess 30 is offset towards the inside of the cage segment with respect to the guiding surface 28. The recess 30 is oriented towards the outside of the cage segment. In the exemplary embodiment illustrated, a single recess 30 is formed on the guiding surface 28 and centred on the guiding surface 28. The bottom of the recess 30 is linked on either side to the guiding surface 28 by tapered surfaces (not referenced). As a variant, it could be possible to provide at least two recesses on the guiding surface 28 spaced apart in the circumferential direction. In the exemplary embodiment illustrated, the recess 30 extends over the entire width of the guiding surface 28. Alternatively, the recess 30 could have a reduced dimension.

Figure 3:
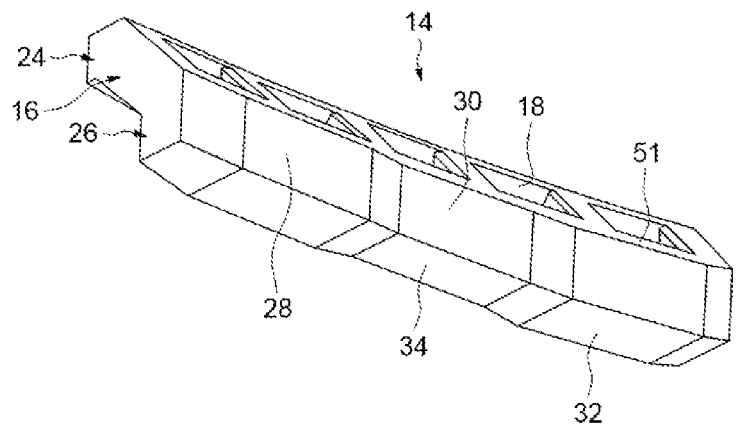
Figure 4:
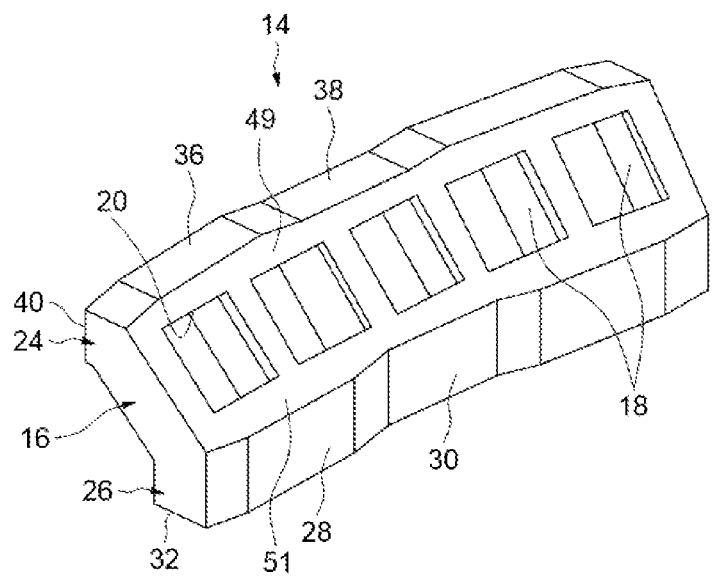

As can be seen in FIG. 3, a recess 34 is formed on the free end surface 32 and centred on the free end surface 32. The bottom of the recess 34 is offset towards the inside of the cage segment with respect to the free end surface 32.

The recess 34 is oriented towards the outside of the cage segment. In the exemplary embodiment illustrated, a single recess 34 is formed on the free end surface 32. The bottom of the recess 34 is linked on either side to the free end surface 32 by tapered surfaces (not referenced). As a variant, it could be possible to provide at least two recesses on the free end surface 32 spaced apart in the circumferential direction. In the exemplary embodiment illustrated, the recess 34 extends over the entire width of the free end surface 32. Alternatively, the recess 34 could have a reduced dimension.

The first lateral shoulder 24 comprises a guiding surface 36 linking a free end surface 40 of the shoulder to the central portion 16. As can be seen in FIG. 1, the guiding surface 36 is intended to come axially opposite the inner ring 3. The free end surface 40 is intended to come radially opposite the outer ring 2.

Referring once again to FIGS. 4 and 5, a recess 38 is formed on the guiding surface 36 and centred on the guiding surface 36. The bottom of the recess 38 is offset towards the inside of the cage segment with respect to the guiding surface 36. The recess 38 is oriented towards the outside of the cage segment. In the exemplary embodiment illustrated, a single recess 38 is formed on the guiding surface 36. The bottom of the recess 38 is linked on either side to the guiding surface 36 by tapered surfaces (not referenced). As a variant, it could be possible to provide at least two recesses on the guiding surface 36 spaced apart in the circumferential direction. In the exemplary embodiment illustrated, the recess 38 extends over the entire width of the guiding surface 36. Alternatively, the recess 38 could have a reduced dimension.

Figure 5:
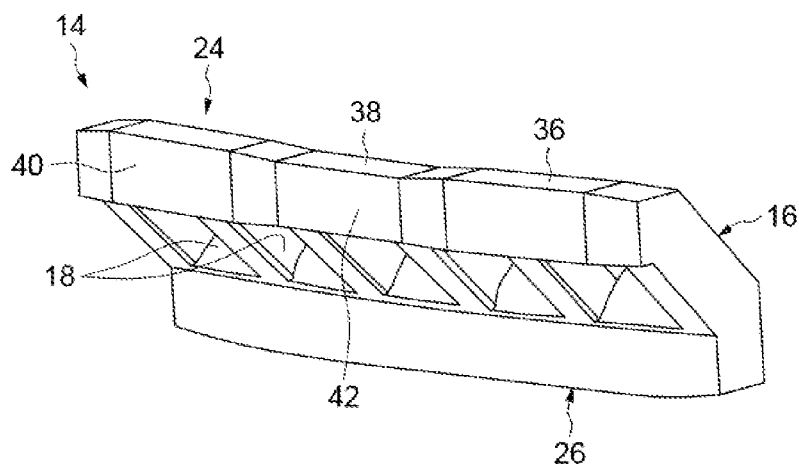

As can be seen in FIG. 5, a recess 42 is formed on the free end surface 40. The bottom of the recess 42 is offset towards the inside of the cage segment with respect to the free end surface 40 and centred on the free end surface 40. The recess 42 is oriented towards the outside of the cage segment. In the exemplary embodiment illustrated, a single recess 42 is formed on the free end surface 40. The bottom of the recess 42 is linked on either side to the free end surface 40 by tapered surfaces (not referenced).

As a variant, it could be possible to provide at least two recesses on the free end surface 40 spaced apart in the circumferential direction. In the exemplary embodiment illustrated, the recess 42 extends over the entire width of the free end surface 40. Alternatively, the recess 42 could have a reduced dimension.

The recess 42 extends the recess 38, and the recess 34 extends the recess 30.

Figure 6:
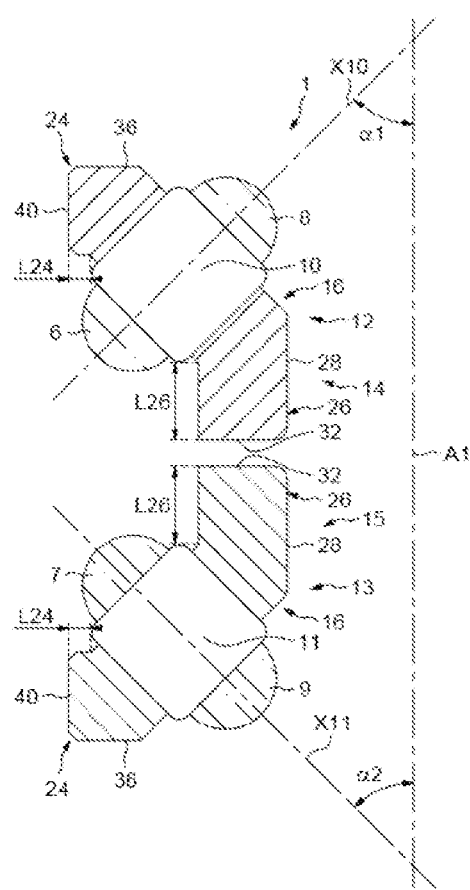
FIG. 6 is a detail view of FIG. 1.

FIG. 6 illustrates the rolling bearing 1 without the inner and outer rings 2, 3.

The second shoulders 26 of the cage segments 14 of the segmented cage 12 are axially opposite the second shoulders 26 of the cage segments 15 of the segmented cage 15.

The second shoulders 26 of the cage segments 14, 15 of cages 12, 13 extend axially and the first shoulders 24 of the cage segments 14, 15 of the cages extend radially.

The radial length L24 of the first shoulder 24 is less than the radial length L26 of the second shoulder 26.

The axis of rotation X10 of a first row of rollers 10 forms an angle of orientation α1 with the axis of rotation A1 of the rolling bearing 1, and the axis of rotation X11 of a second row of rollers 11 forms the angle of orientation α1 of opposite sign α2 with the axis of rotation A1 of the rolling bearing 1. The opposing orientation of the axes of rotation X10, X11 of the first and second rows of rollers 10, 11 with respect to the axis of rotation A1 of the rolling bearing allows the rolling bearing 1 to support higher axial and radial loads than a rolling bearing with crossed rollers according to the state of the art.

For example, the angle α1 formed by the axes X10 and A1 is equal to 45° and the angle α2 formed by the axes X11 and A1 is equal to −45° such that the rolling bearing 1 supports axial and radial loads of the same maximum value.

As a variant, the values of the angles α1 and α2 can be different values.

The recesses 30, 38, 42 of the guiding surfaces 28, 36, 40 make it possible to reduce the friction surface of the cage segments 13, 14 on the inner and outer rings.

The recess 34 of the free end surface 32 makes it possible to limit the friction and the deterioration of the cage segments 13, 14 when they enter into contact.

Furthermore, the recesses 30, 38 form lubricant reservoirs allowing the rollers 10, 11 to be lubricated.

Figure 7:
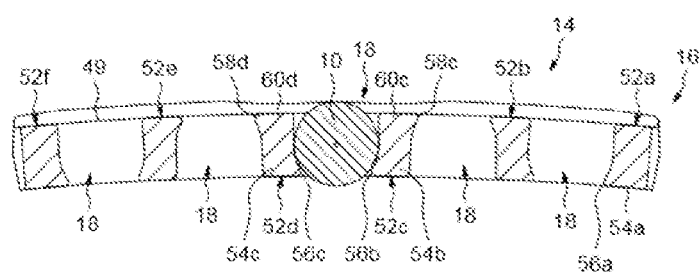
FIG. 7 is a cross-sectional view of the cage segment of FIGS. 2 to 5 inside which a roller is housed.

FIG. 7 is a cross-sectional view of the central portion 16 of the cage segment 14. In the interests of clarity, a single roller 10 is represented in one of the pockets. Obviously, each pocket 18 houses one roller.

As indicated previously, the cage segment 14 comprises a plurality of beams 52a, 52b, 52c, 52d, 52e, 52f extending transversely between the first and second walls 49, 51 (FIG. 2) and linking the walls. The beams 52a to 52f are spaced apart from one another in the circumferential direction.

Each pocket 18 is delimited in the circumferential direction by two successive beams 52a and 52b, 52b and 52c, 52c and 52d, 52d and 52e, 52e and 52f. Each beam 52b, 52c, 52d, 52e partly delimits two successive pockets 18 apart from the beams 52a and 52f situated at the ends of the cage segment 14 which each partly delimit a single pocket 18a, 18e.

Since the beams 52b, 52c, 52d, 52e are of identical design, and the end beams 52a and 52f are of identical design, only the beams 52c and 52d and the end beam 52a are detailed.

The beams 52a, 52c, 52d comprise, at a lateral end 54a, 54b, 54c, a first protuberance 56a, 56b, 56c of concave outer form and intended to come into contact with the outer surface of the roller 10. The protuberances 56b, 56c of two successive beams are opposite in the circumferential direction for each through pocket 18.

The protuberances 56a, 56b, 56c keep the cage segment 14 centred on the rollers 10 so that, at high relative rolling speed of the outer ring 2 with respect to the inner ring 3, when the centrifugal force throws the cage segment 14 towards the inner ring 3, the cage segment 14 is kept centred by the rollers 10 between the raceways 6, 8 reducing the risk of friction of the cage segment 14 on the inner ring 3.

The beams 52c and 52d comprise a second protuberance 58c, 58d of concave outer form disposed on the lateral ends 60c, 60d opposite the lateral ends 54b, 54c.

The alternate disposition of the positioning of the protuberances 56b, 56c, 58c, 58d on one of the ends 54b, 54c, 60c, 60d of the beams 52c, 52d delimiting the pockets 18b, 18c, 18d makes it possible to simplify the mounting of the segment 14 in the rolling bearing 1 and to centre the cage segment 14 on the rollers 10 so that, when the relative rolling speed of the outer ring 2 with respect to the inner ring 3 is not great enough to neutralize the gravity driving the cage segment 14 under the effect of its weight towards the outer ring 2, the cage segment 14 is kept centred by the rollers 10 between the raceways 6, 8, reducing the risk of friction of the cage segment 14 on the outer ring 2.

The protuberances 56b, 56c extend circumferentially on the side of the pocket 18 delimited by the beams and the protuberances 58c, 58d extend circumferentially on the side of the other pockets 18 delimited by the beams.

The protuberance 56b of the beam 52c is opposite, in the circumferential direction, the protuberance 56c of the successive beam 52d.

As a variant, the second protuberances of concave outer form 58c, 58d can be disposed on the lateral ends 54b, 54c, the second protuberances of concave outer form 58c, 58d extending circumferentially on the side of the pockets 18b, 18d delimited respectively by the beams.

The protuberances 56a, 56b, 56c, 58c, 58d are identical.

As a variant, the protuberances 56a, 56b, 56c, 58c, 58d can be different.

As illustrated, the concave protuberances 56a, 56b, 56c, 58c, 58d have a circular form when considering an axial cross section of the cage segment.

Obviously, the concave protuberances 56a, 56b, 56c, 58c, 58d can have a different form.

According to one embodiment, the radius of curvature of each protuberance 56a, 56b, 56c, 58c, 58d is greater by 1.5% to 2.5%, and preferably greater by 2%, than the radius of the rollers 10.

Each pocket 18 comprising such a radius of curvature moulds to the roller 10 over a greater surface of the roller 10 so as to hold the roller 10 and such that the rollers 10 keep the cage segment 14 centred on the rollers 10.

Obviously, the pockets 18 can have a different configuration, notably without concave protuberances 56a, 56b, 56c, 58c, 58d or with concave protuberances produced from segments to approximate a circular form when considering an axial cross section of the cage segment.

The invention claimed is:

1. A cage segment for a rolling bearing, the cage segment comprising:
   a central portion extending in the circumferential direction and delimiting a plurality of through pockets for receiving rollers, the central portion comprising first and second walls extending in the circumferential direction and provided with internal surfaces opposite one another and forming abutment surfaces for the end faces of the rollers, the cage segment comprising a plurality of beams extending transversely between the first and second walls in order to delimit the pockets, each of the plurality of through pockets comprising a circumferential through pocket length, the circumferential through pocket length being measured in the circumferential direction, and a first lateral shoulder outwardly extending the first wall of the central portion, a second lateral shoulder outwardly extending the second wall of the central portion by being oriented at right angles to the first lateral shoulder, and at least one outwardly open recess being formed on each of the first and second lateral shoulders, the at least one outwardly open recess comprising a circumferential recess length measured in the circumferential direction, the circumferential recess length being greater than the circumferential through pocket length.

2. The cage segment according to claim 1, wherein the at least one outwardly open recess is formed on a guiding surface of the first lateral shoulder which links a free end surface of the shoulder to the central portion.

3. The cage segment according to claim 1, wherein the at least one outwardly open recess is formed on a free end surface of the first lateral shoulder.

4. The cage segment according to claim 1, wherein the at least one outwardly open recess is formed on a guiding surface of the second lateral shoulder which links a free end surface of the shoulder to the central portion.

5. The cage segment according to claim 1, wherein the at least one outwardly open recess is formed on a free end surface of the second lateral shoulder.

6. The cage segment according to claim 1, wherein the axial length of the second shoulder is greater than the radial length of the first shoulder.

7. A rolling bearing comprising:
an inner ring,
an outer ring,
at least two rows of rollers disposed between raceways of the rings, and
at least two segmented cages for holding the rows of rollers, each segmented cage comprising a plurality of cage segments including a central portion extending in the circumferential direction and delimiting a plurality of through pockets for receiving rollers, each of the plurality of through pockets comprising a circumferential through pocket length measured in the circumferential direction, the central portion comprising first and second walls extending in the circumferential direction and provided with internal surfaces opposite one another and forming abutment surfaces for the end faces of the rollers, the cage segment comprising a plurality of beams extending transversely between the first and second walls in order to delimit the pockets, and a first lateral shoulder outwardly extending the first wall of the central portion, a second lateral shoulder outwardly extending the second wall of the central portion by being oriented at right angles to the first lateral shoulder, and at least one outwardly open recess being formed on each of the first and second lateral shoulders, the at least one outwardly open recess comprising a circumferential recess length measured in the circumferential direction, the circumferential recess length being greater than the circumferential through pocket length, wherein the second shoulders of the cage segments of one of the cages are axially opposite the second shoulders of the cage segments of the other cage.

8. The rolling bearing according to claim 7, wherein the first shoulders of the cage segments of the cages extend radially and the second shoulders of the cage segments of the cages extend axially.

9. The rolling bearing according to claim 7, wherein the axis of rotation of a first row of rollers forms an angle of orientation with the axis of rotation of the rolling bearing, and the axis of rotation of a second row of rollers forms the angle of orientation of opposite sign with the axis of rotation of the rolling bearing.

10. The rolling bearing according to claim 9, wherein the angle is equal to 45°.

* * * * *